United States Patent [19]
DuBose

[11] Patent Number: 5,560,443
[45] Date of Patent: Oct. 1, 1996

[54] HOVERCRAFT HAVING SEGMENTED SKIRT WHICH REDUCES PLOWING

[76] Inventor: Ralph K. DuBose, 4226 Milton St., Houston, Tex. 77009-2470

[21] Appl. No.: 312,554

[22] Filed: Sep. 26, 1994

[51] Int. Cl.$^6$ ........................................................ B60V 1/16
[52] U.S. Cl. ........................................ 180/121; 180/127
[58] Field of Search ................................. 180/116, 121, 180/122, 124, 127, 128, 129

[56] References Cited

U.S. PATENT DOCUMENTS

| | | | |
|---|---|---|---|
| 3,362,499 | 1/1968 | Tripp | 180/128 |
| 3,379,271 | 4/1969 | Hopkins et al. | 180/127 |
| 3,444,952 | 5/1969 | Clarke | 180/127 |
| 3,754,617 | 8/1973 | Duthion et al. | 180/121 |
| 3,805,913 | 4/1974 | Jackes | 180/128 |

FOREIGN PATENT DOCUMENTS

| | | | |
|---|---|---|---|
| 905756 | 7/1972 | Canada | 180/127 |
| 1-247262 | 10/1989 | Japan | 180/121 |

*Primary Examiner*—Karin L. Tyson
*Attorney, Agent, or Firm*—Bill B. Berryhill

[57] ABSTRACT

A self-propelled hovercraft having a body or hull around the periphery of which is a segmented skirt. The segmented skirt of the hovercraft comprises a plurality of bags, one adjacent to another, completely encircling the hovercraft body. Each of the bags has front and side portions and, in one embodiment, at least some of the bags at the forward end of the hovercraft are provided with semi-rigid lower front surfaces constructed of material less flexible than material of other bags and which may be provided with internal cushion devices which support the front semi-rigid material against water surface contact.

8 Claims, 2 Drawing Sheets

HOVERCRAFT HAVING SEGMENTED SKIRT WHICH REDUCES PLOWING

BACKGROUND OF THE INVENTION

1. Field of the Invention

The present invention pertains to self-propelled hovercraft. More specifically, the present invention pertains to apparatus for inhibiting plowing in of hovercraft and increasing the stability thereof when such hovercraft encounters sudden increased surface contact involving the peripheral skirt. In particular, the present invention pertains to improved segmented skirt apparatus designed to increase stability of the hovercraft and to inhibit plowing in of the hovercraft in response to sudden increased surface contact, particularly in water.

2. Description of the Prior Art

"Hovercraft" refers to an amphibious version of a more general air cushion class of vehicles, sometimes called ground effect machines. Hovercrafts are machines which slide along the surface of the ground or a body of water while balancing on top of an air cushioned bubble. The air bubble is generated by a power driven fan, a portion of the air from which is directed into an air plenum provided on the underneath side of the hovercraft body. A flexible skirt of some type is provided around the machine to retain the bubble beneath the machine by limiting peripheral air loss. Lubrication provided by the air bubble enables the machine to slide across relatively flat and smooth surfaces such as grass, snow, ice, water, mud, sand, and even some crops growing therefrom. The power driven fan supplies not only enough air to lift the machine on its cushion or bubble of air but also the power necessary for propelling the vehicle across the ground or water above which it is supported.

The skirts of early hovercraft were of several designs. Some skirts consisted of brush stubble attached around the edge of the machine. On some machines the brush height could be adjusted. Brush skirts proved to be unstable, stiff and ineffective and are no longer in use.

In 1959, Jene Bertin, a French engineer—inventor, invented the jupe skirt, sometimes referred to as the "cell skirt". The jupe or cell appears as the frustrum of a cone resting upside down. It slopes toward the bottom and inflates in a conical shape. Although the jupe or cell skirt is not widely used, some hovercraft use this design.

Until recent years, the most widely used hovercraft skirt was the bag skirt which took the shape of a giant inner tube fitted around a craft's perimeter. Air pressure is needed to inflate the bag and maintain inflation against the air pressure of the air cushion under the craft.

In more recent years, the convoluted, segmented, or finger skirt has found widespread use in Europe and the United States. Almost all European and American hovercraft are fitted with such segmented skirts. With the segmented skirt, a plurality of bags, one adjacent to another, completely encircles the hovercraft body. Each of the bags, having front and side portions, is in fluid communication with an air plenum and, together, provide a flexible seal between the air cushion under the hovercraft and the ground or water across which the hovercraft is to be propelled. The individual bags, made of flexible material, allow the hovercraft to slide across the terrain, even though the terrain is not perfectly smooth and may have objects, such as stumps, projecting upwardly therefrom, allowing the collapse or displacement of one or two bags without disturbing others. The segmented skirt is thus a substantial improvement over the prior art.

Although the segmented skirt hovercraft is the most widely accepted design, it still has problems, particularly when traveling across water. When a hovercraft encounters sudden increased surface contact, particularly in water, it has a tendency to "plow" into the water. Plowing in is a very undesirable phenomena in which the front hull of the hovercraft makes sufficient contact with the water surface to cause rapid deceleration and instability (loss of control). The plowing in phenomena appears to be due to a combination of effects from variations in skirt drag and forward weight transfer. This transition from normal operation to plowing in occurs when, for any reason, a sudden increase in water surface drag on the skirts causes craft deceleration and transfer of weight to the front of the craft. This pushes the front skirts into greater surface contact with the water, resulting in even greater drag and deceleration. There is a chain reaction which proceeds quickly to the point where the hull of the hovercraft if forced into the water surface causing very rapid deceleration and loss of control.

In an effort to overcome the plowing in phenomena, prior art designs have attempted to increase air flow and pressure at the front of the hovercraft and by providing means of transferring weight in the hovercraft or with aerodynamic controls to maintain a "nose up" operational attitude. While these approaches have been somewhat successful, further improvements are needed.

SUMMARY OF THE INVENTION

The present invention is a self-propelled hovercraft having a body or hull provided with an air plenum chamber around the periphery of which is a segmented skirt and which, when supplied with a sufficient air flow, supports the hovercraft above the surface of the ground or water across which it is to be propelled. The segmented skirt of the hovercraft of the present invention comprises a plurality of bags, one adjacent to another, completely encircling the hovercraft body. Each of the bags has front and side portions and is in fluid communication with the air plenum to provide a flexible seal between the air cushion supporting the hovercraft and the ground or water across which the hovercraft is to be propelled.

In one embodiment of the invention, at least some of the skirt bags at the forward end of the hovercraft are altered from the prior art such that at least the front lower quadrant of these skirt bags are made of a semi-rigid material capable of maintaining a substantially flat, smooth surface in response to high speed water contact. In addition, this semi-rigid lower quadrant forward surface is supported from inside the bag by a cushion device of any type that prevents collapse of the bag in response to increasing water contact. This cushion device is located in relation to the semi-rigid skirt front so the skirt front will curve around it in response to water surface contact in such a way that it's lower portion forms a "ski" shape against the water surface, transferring the hovercraft.

Thus, the improved self-propelled hovercraft of the present invention is one in which the bags of the segmented skirt at the front of the craft are modified to avoid wide variations in skirt drag as water contact varies and to produce sufficient upward acting hydrodynamic force at the front of the craft, as the front moves downward, to prevent hull contact with the water surface. These goals are achieved by modifying the lower front quadrant surface of the skirt bags and by placement of resilient cushion devices on the interior of the skirt bags. The cushion devices provide a force connection between the lower edge of the flat, less flexible or semi-rigid skirt surfaces and the front of the hovercraft hull. This causes the lower edge of the lower front semi-rigid surface to curve inwardly with water pressure in such a way as to form a curved ski shape. This produces low drag and upward force as water contact increases.

There are several advantages of the hovercraft of the present invention with its improved or modified segmented skirt design. First and foremost, plowing in is easily preventable within normal weight distribution and air cushion pressure parameters. Secondly, the hovercraft can be safely operated in a flat or nose down attitude without fear of plowing in so that air resistance and water spray from under the front skirts is greatly reduced or eliminated. Furthermore, because the hovercraft may be safely operated in a flat or nose down attitude, the magnitude of lateral control forces at the rear of the craft needed to change craft heading is reduced because skirt drag at the rear of the craft can be correspondingly reduced and the center of yaw is moved forward. In addition, performance on water with waves higher than the air cushion height is improved because collision with the wave tops is more cushioned and produces less skirt and hull drag than with skirts of the prior art. Many other advantages of the invention will be apparent from reading the specification which follows in conjunction with the accompanying drawings.

DESCRIPTION OF PREFERRED EMBODIMENTS

Figure 1:
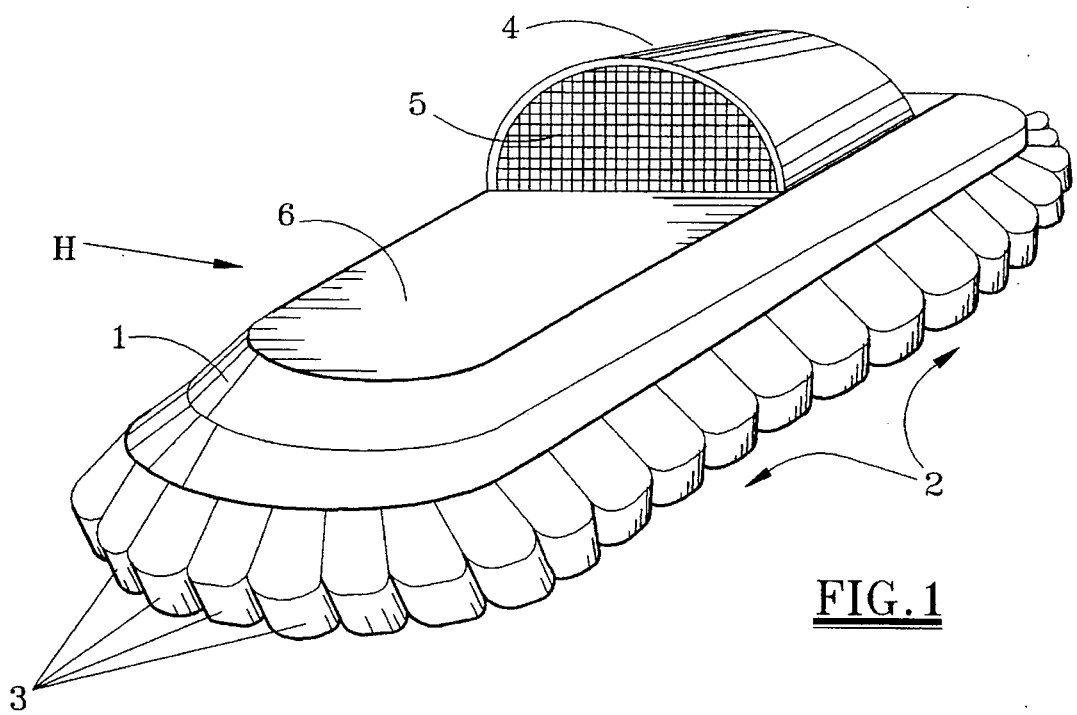
FIG. 1 is a pictorial representation of a self-propelled hovercraft having a segmented skirt.
Figure 2:
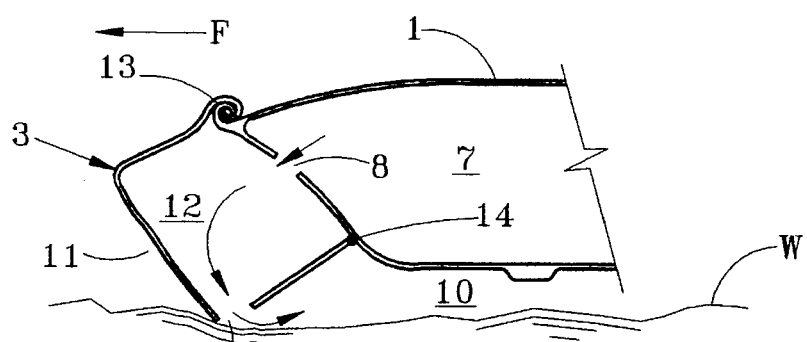
FIG. 2 is a partial sectional elevational view of a segmented skirt hovercraft illustrating a bag of which the segmented skirt is comprised, according to the prior art.

Referring first to FIG. 1 there is shown a hovercraft H having a hull or body 1 which is provided with an air plenum chamber (not shown) and around the periphery of which is a segmented skirt 2. The segmented skirt 2 comprises a plurality of skirt bags 3, one adjacent to another, completely encircling the hovercraft hull or body 1. One of the bags 3 is represented in cross-section in FIG. 2. The hovercraft H may be provided with a power-driven fan enclosed in a shroud 4 at the front of which is provided a protected air intake 5. A passenger area 6, in which controls for operation of the hovercraft H may be disposed, as shown at 6. Air is drawn through the intake 5 by the power-driven fan which then directs some of the air downwardly into the air plenum 7 (see FIG. 2) and the skirt bags 3 to support the hovercraft H above the surface of the ground or water W as illustrated in FIG. 2. The other air is directed generally rearwardly of the hovercraft H to propel the hovercraft H in a forwardly direction. As shown in FIG. 2, the air supplied from the power driven fan to the air plenum 7 flows through peripheral apertures 8 into the bags 3 causing them to be inflated as shown in FIG. 2 and through apertures 9 to form an air bubble or cushion 10 beneath the hovercraft for supporting it above the water W. Although there is some air leakage under the bags 3, the bags 3 and skirt 2 formed thereby serve as a flexible seal to limit the loss of air from the cushion 10.

The bag 3, illustrated in FIG. 2, is illustrated as one of the bags at the forward end of the hovercraft H and would assume the general position shown in FIG. 2 as the hovercraft moves in a forwardly direction depicted by the arrow F therein. The bags 3 are usually made of a flexible material such as neoprene coated nylon, such material commonly being used in the United States with the manufacture of truck tarpaulins. The bags 3 are individually constructed and generally provide front portions 11 and side portions 12 which are juxtapositioned to the corresponding side portion of an adjacent bag 3. Each bag may be connected to the hull or body 1 by upper clamp 13 and a lower attachment 14 of any suitable type. It is preferable that the clamp 13 and attachment 14 are of the type which may be disconnected or torn away from the hull 1 in case an individual bag 3 is snagged or encountered by an immovable object which cannot be normally transversed by the hovercraft H.

Figure 3:
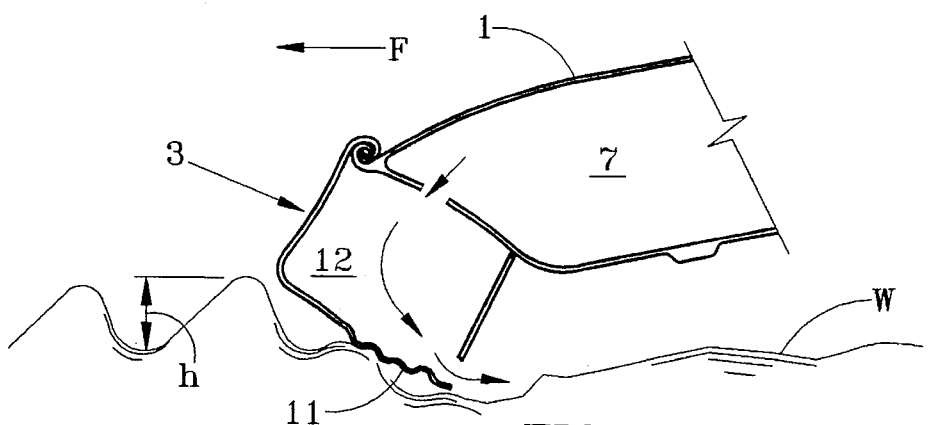
FIG. 3 is a partial section elevation view, similar to FIG. 2, but showing the bag thereof as encountering sudden increased resistance to forward movement resulting in plowing of the hovercraft, according to the prior art.

Referring now to FIG. 3, the phenomena of plowing in associated with segmented skirt designs of the prior art will be illustrated. If, for any reason, there is a sudden increase in skirt drag on the water surface, there is a transfer of weight to the front of the craft caused by deceleration and craft center of mass which is well above the water surface. The combination of increased drag and transfer of weight pushes the front bags 3 of the segmented skirt 2 into greater surface contact with the water W. This results in further increase in drag and deceleration of the hovercraft. A chain reaction proceeds quickly to the point where the hull of the craft is forced toward the water surface W in the direction indicated by the arrow F in FIG. 3, resulting in rapid deceleration, instability and loss of control of the hovercraft.

Figure 4:
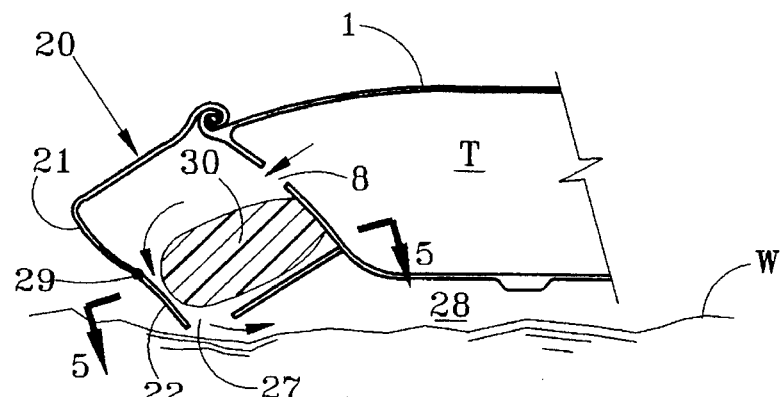
FIG. 4 is a partial sectional elevational view similar to FIG. 2, but illustrating a segmented skirt in which the bags or fingers thereof are modified, according to a preferred embodiment of the invention.
Figure 5:
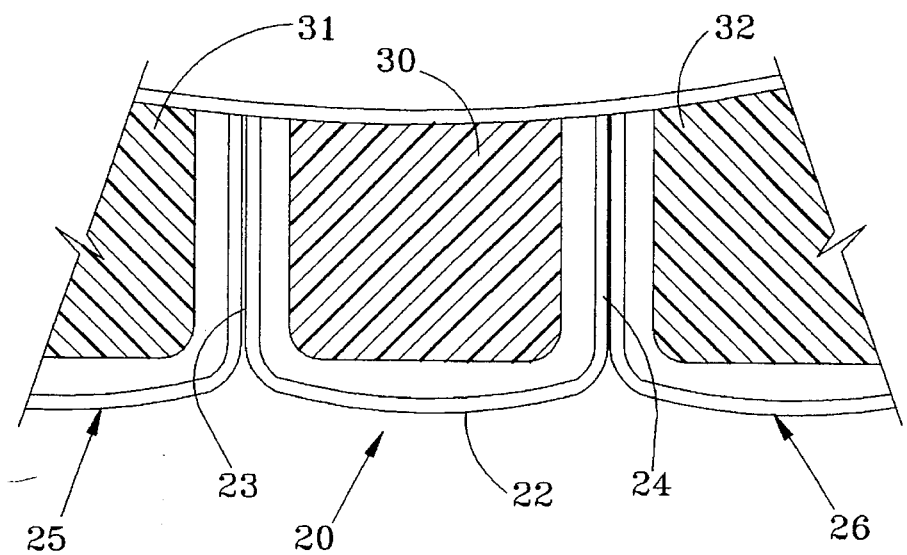
FIG. 5 is a cross-sectional view of the modified skirt bag of FIG. 4, taken along lines 5—5 thereof, according to a preferred embodiment of the invention.
Figure 6:
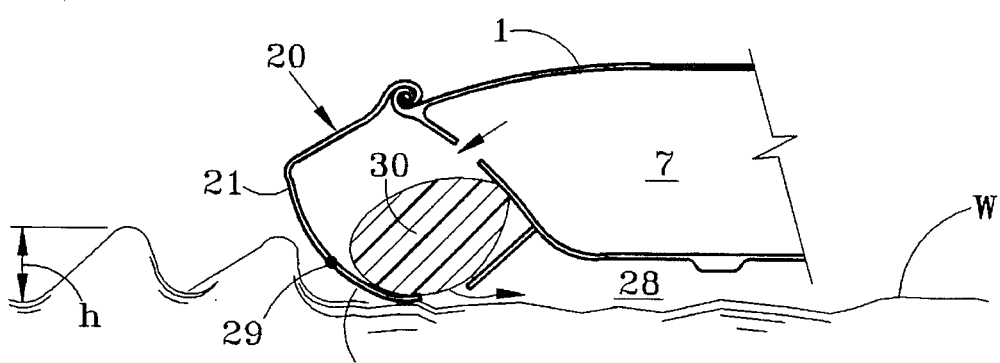
FIG. 6 is a partial sectional elevation view of the modified segmented skirt bags of FIGS. 4 and 5 as it responds to the nose of the craft being forced down for any reason, according to a preferred embodiment of the invention.

Referring now to FIGS. 4, 5 and 6, there is shown the hull or body 1 of a hovercraft H, similar to the hovercraft H of FIG. 1, having an air plenum 7 identical thereto. Peripheral apertures 8 allow air from the plenum 7 to enter bags 20 to form a bag segmented skirt similar to the segmented skirt 2 of FIG. 1. However, the bags 20 are modified and designed to prevent plowing in.

The bags 20 have the same general shape as the bags 3 of FIGS. 2 and 3 having front portions 21, 22 and side portions 23, 24 which are adjacent to corresponding side portions of adjacent bags 25, 26. As indicated, each of the bags 20, 25, 26, are in fluid communication with the air plenum 7 through apertures 8. Thus, air flows from the plenum 7 into the bag 20 out apertures 27 to form an air cushion or bubble 28 underneath the hovercraft.

At least some of the bags 20, 25, 26, etc. at the forward end of the hovercraft are also provided with internal cushion devices 30, 31, 32, which can take many forms. In the exemplary embodiment, the cushion devices 30, 31, 32 are made of a somewhat resilient material and attached to the hull 1 of the hovercraft. They have the same general configuration, in cross-section, as best seen in FIG. 5, as the bags 20.

When the hovercraft encounters a sudden increase in skirt drag, such as increased wave height h, the cushion device 30 is engaged by the front portion 22 of bag 20 (see FIG. 6). The cushion device 30 may contract toward the hovercraft hull or body 1 but prevents substantial deformation or collapse of the bag 20 as would occur in bags of the prior art without a cushion device, such as shown in FIG. 3. Limiting the collapse of bag 20 also limits the friction or drag of the bag 20 through the water W and inhibits plowing of the hovercraft thereby increasing the stability thereof.

As previously mentioned, the bags 20 are made of a flexible material such as used in the manufacture of tarpaulins. However, in preferred embodiments of the invention, at least the lower area 22 of the front portions 21, 22 thereof would be made of a material which is semi-rigid or substantially less flexible than the other materials of the bag or the bags disposed on the sides and at the rear of the hovercraft. The flexible material of the upper area 21 might be connected to the semi-rigid or less flexible material of the lower area 22 by a substantially horizontal seam 29. The seam 29 provides, in effect, an articulated joint about which the lower less flexible area 22 may pivot against the cushion device 30. Since the lower area 22 is semi-rigid or less flexible than the other portion of the bag, it curves with water pressure in such a way as to form a ski shape. This produces low drag and upward force as water contact increases allowing the front of the hovercraft to move through the increased contact with the water surface of increased height H water waves W and preventing plowing of the hovercraft such as that which occurs with designs of the prior art as illustrated in FIG. 3.

Thus, by modifying the segmented skirt bags at the forward end of a hovercraft by providing cushion devices and less flexible front areas, drag and collapse of the bags is limited so as to inhibit plowing in of the hovercraft in response to sudden increased water contact with the skirts. This is easily accomplished within normal weight distribution parameters. The hovercraft can be operated safely in a flat or nose down attitude, reducing air resistance and water spray and the magnitude of lateral control forces at the rear of a craft needed to alter craft heading are reduced. Performance of the hovercraft, particularly on water of increased wave height, is substantially improved.

A single embodiment of the cushioning device of the present invention has been described herein. Many other designs would also be effective. Although the cushion device of the exemplary embodiment is shown attached to the hull 1, it could also be attached to the bag 20.

In like manner, the exemplary embodiment of the bag 20 in which the front portion is divided into an upper flexible area and a semi-rigid or less flexible area joined by a substantially horizonal seam could also be modified. For example, the entire front portion could be made of a material which is semi-rigid or less flexible than other bag material.

These alternate embodiments are mentioned to illustrate the fact that many variations of the invention can be made without departing from the spirit of the invention. Accordingly, it is intended that the scope of the invention be limited only by the claims which follow.

I claim:

1. A self-propelled hovercraft having a body and an air plenum chamber around the periphery of which is a segmented skirt and which when supplied with sufficient air flow will support said hovercraft on a cushion of air above the surface of ground or water across which said hovercraft is to be propelled and power-driven fan means for directing air flow to said air plenum and generally rearwardly of said hovercraft to propel said hovercraft in a forwardly direction characterized by:

a plurality of bags, one adjacent to another, completely encircling said hovercraft body to provide said segmented skirt, each of said bags having front and side portions and being in fluid communication with said air plenum to provide a flexible seal between said cushion of air and the ground or water across which said hovercraft is to be propelled, said segmented bags being made of flexible materials but at least the lower area of the front portions of at least some of said bags at the forward end of said hovercraft being joined to substantially flat semi-rigid material, at least some of said bags at said forward end of said hovercraft also being provided with internal cushion devices so that when said forward end segmented bags encounter increased water resistance to forward movement the semi-rigid front portions of said forward end bags curve around a point of engagement with said cushion device to cooperate in limiting drag and providing hydrodynamic lift to the forward end of said hovercraft to inhibit plowing in of said hovercraft and to increase the stability thereof.

2. The self-propelled hovercraft of claim 1 which said internal cushion devices are resilient so that upon engagement by said front portions of a respective bag they contract toward said hovercraft body but upon reduction of said resistance to forward movement said cushion devices expand to return said bags toward a more normal disposition.

3. The self-propelled hovercraft of claim 2 in which the upper areas of said front portions of said forward end bags which are of said flexible material are joined to said semi-rigid lower area material by substantially horizontal connection means.

4. The self-propelled hovercraft of claim 3 in which said front portions of said forward end bags, upon said increased water resistance, are engageable with said internal cushion devices near said horizontal connection means to provide substantially articulated joints about which said lower semi-rigid area of said front portions may pivot to provide curved ski-like surfaces.

5. A self-propelled hovercraft having a body and an air plenum chamber around the periphery of which is a segmented skirt and which when supplied with sufficient air flow will support said hovercraft on a cushion of air above the surface of ground or water across which said hovercraft is to be propelled and power-driven fan means for directing air flow to said air plenum and generally rearwardly of said hovercraft to propel said hovercraft in a forwardly direction characterized by:

a plurality of bags, one adjacent to another, completely encircling said hovercraft body, to provide said segmented skirt, each of said bags having front and side portions and being in fluid communication with said air plenum to provide a flexible seal between said cushion of air and the ground or water across which said hovercraft is to be propelled, said bags being of a flexible material but at least the lower area of some of said bag front portions at the forward end of said hovercraft being of a material which is semi-rigid so that when said hovercraft encounters sudden increased skirt drag, said semi-rigid lower areas of said forward end bags will not be as easily deformed and will provide semi-rigid smooth surfaces to inhibit plowing of said hovercraft and to increase the stability thereof.

6. The self-propelled hovercraft of claim 3 in which upper areas of said bag front portions are joined to said semi-rigid lower areas thereof by substantially horizontal connection means to substantially provide articulated joints about which said lower semi-rigid areas may pivot to provide ski-like surfaces for engagement with said ground or water.

7. The self-propelled hovercraft as set forth in claim 5 in which at least some of said forward end bags are provided, internally thereof, with cushion means which, when said hovercraft encounters sudden increased water contact drag, are engageable by the front portions of respective bags near said connection means and cooperate with said lower semi-rigid area of said forward end bags in providing a curved ski-like surface, limiting drag and of said bags and transferring hydrodynamic lift forces to the forward end of said hovercraft to inhibit plowing in of said hovercraft and to increase the stability thereof.

8. The self-propelled hovercraft of claim 7 in which said cushion means is resilient so that upon engagement by said front portion of a respective bag said cushion means contracts toward said hovercraft body but upon reduction of said resistance to forward movement said cushion means expands to return said bags toward more normal dispositions.

* * * * *